No. 856,244. PATENTED JUNE 11, 1907.
E. E. GAMON.
DISK METER.
APPLICATION FILED SEPT. 12, 1906.

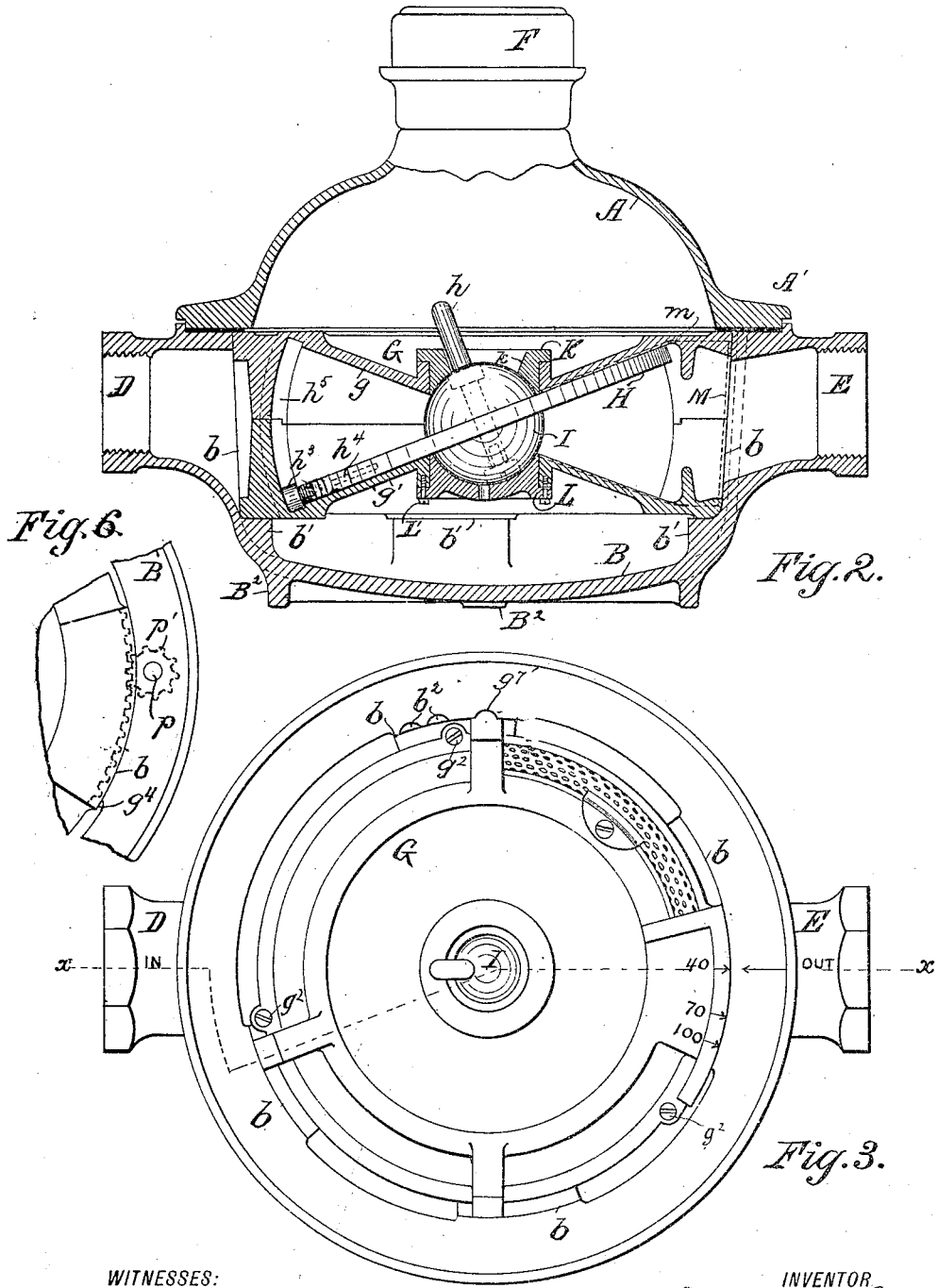

3 SHEETS—SHEET 3.

WITNESSES:

INVENTOR
Ernest E. Gamon
BY
Fischer & Sanders.
ATTORNEYS.

UNITED STATES PATENT OFFICE.

ERNEST E. GAMON, OF LONG ISLAND CITY, NEW YORK, ASSIGNOR TO NEPTUNE METER COMPANY, OF LONG ISLAND CITY, NEW YORK, A CORPORATION OF NEW JERSEY.

DISK METER.

No. 856,244.　　　　Specification of Letters Patent.　　　Patented June 11, 1907.

Application filed September 12, 1906. Serial No. 334,208.

*To all whom it may concern:*

Be it known that I, ERNEST E. GAMON, a citizen of the United States, residing at Long Island City, in the county of Queens and State of New York, have invented certain new and useful Improvements in Meters; and I do hereby declare the following to be a full, clear, and exact description of the same, such as will enable others skilled in the art to which it pertains to make and use the same.

The object of my invention is to so construct a water meter as to make it possible to procure a uniform delivery from the meter as well as a uniform supply of water from the main feed pipe under varying heads of pressure, by providing a water meter which consists essentially of a main casing, a measuring chamber within said main casing, communicating orifices in said casing and measuring chamber respectively and means for adjusting said orifices to correspond with the varying pressures to which said meter may be subjected.

The improved fastening means whereby the sections of the casing may be more readily connected together than has hitherto been the case in meters of this type, forms the subject matter of another application, Serial No. 334,234, filed September 12, 1906.

Figure 1:
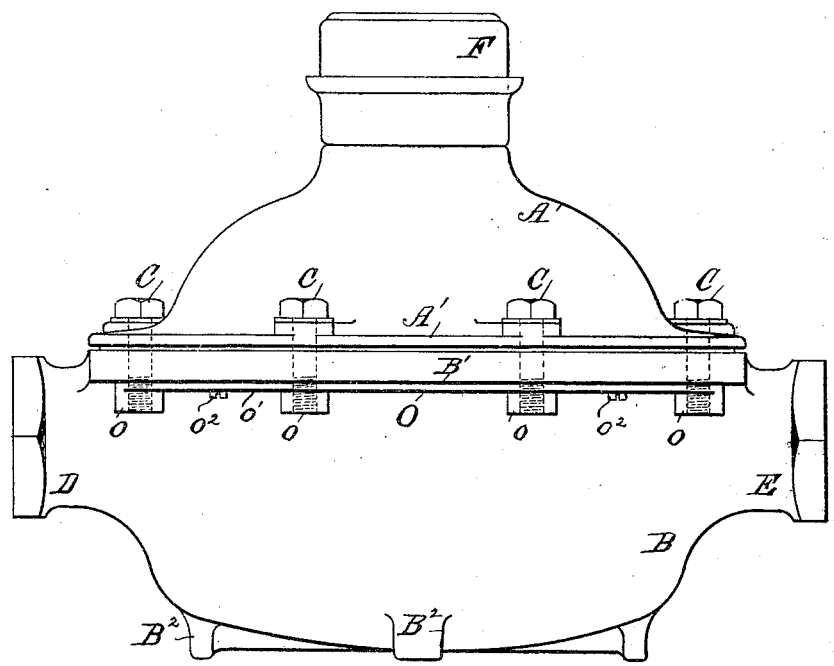
Figure 4:
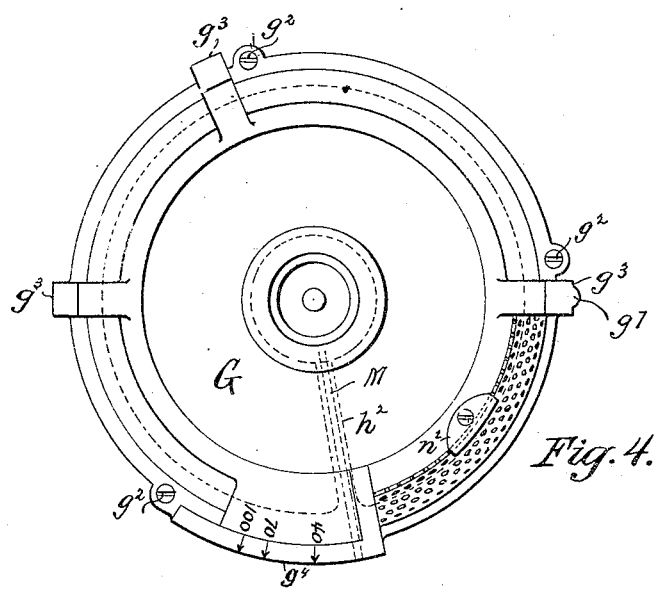
Figure 5:
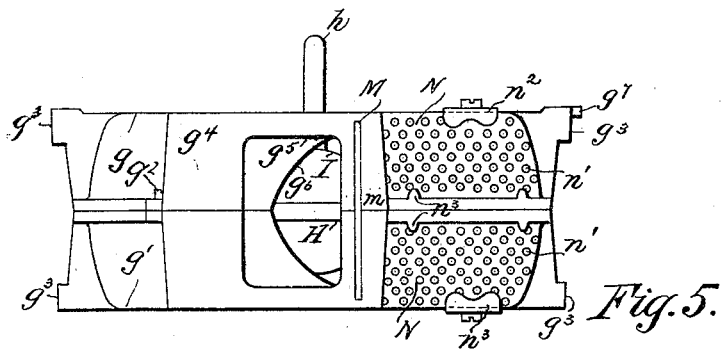

Other features of improvement will be disclosed in the following description, taken in connection with the accompanying drawings, in which Figure 1 is a side view of the meter with the parts assembled. Fig. 2 is a vertical section on line $x$—$x$ of Fig. 3. Fig. 3 is a plan view of the lower section of the meter showing the disk chamber in adjusted position. Fig. 4 is a plan view of the disk chamber removed from the meter casing. Fig. 5 is a side elevation of the disk chamber, and Fig. 6 is a modified form of an adjusting means.

Similar letters of reference refer to like parts throughout the specification and drawings.

The main casing or water chamber proper is formed of the upper section A and the lower section B connected together through the flanges A' and B' by means of the bolts C. Projecting from the lower section B at diametrical points are the inlet and discharge orifices D and E. The gear train or drives are carried in a small case F secured to the upper or dome member A. The lower section B is provided with the feet B² cast integral with said section.

The lower section B is chambered as shown in Fig. 2, and provided with four bearing points or faces $b$, concentric with the vertical axis of the meter and tapering downwardly as illustrated in Figs. 2 and 3. The lower ends of these bearings terminate in the shoulders $b'$, upon which the disk chamber rests when in position.

The disk or measuring chamber G is made of the upper and lower sections $g$ and $g'$, secured together by means of the screws $g^2$, screwed into the flanges of the measuring chamber as illustrated. The bearing points $g^3$ illustrated clearly in Fig. 5 are arranged upon the circumference of the chamber and designed to fit against the bearings $b$ of the casing B. These bearing points $g^3$ taper from top to bottom so as to form a close fit when in position with the bearing faces $b$ of the section B.

Within the chamber is the usual wabbling disk H carried by the spherical bearing I, which is supported by the top and bottom bearings K and L, the adjustment being such that the spherical bearing I may move in any direction between said bearings K and L in the usual manner, the upper bearing K having the opening $k$ for the passage of the driving pin $h$ which pin is usually connected up to the gear train leading to the indicator in any desired or preferred manner. The lateral interior surface of the disk chamber is spherical as usual, the upper and lower portions being in the nature of frustums of cones so that the disk H when in operation always finds a bearing along some line of both the upper and lower cones of the chamber.

The chamber G is provided with a diaphragm M which extends from the outside of the sections of the chamber inwardly into contact with the spherical bearing I being held in position by grooves formed in the upper and lower sections of the chamber as illustrated in Fig. 5. It is understood that the disk H is divided as shown at $h^2$ with the diaphragm M lying in the slot formed by such division. In this manner, the disk is permitted to operate or have its wabbling motion in the usual manner without interference with the diaphragm.

The bearing $g^4$ formed upon the outer surface of the chamber $g$, is considerably broader than the bearing face $g^3$ and extends circumferentially a distance sufficient to be capable of nearly shutting off the discharge orifice E from the interior of the casing B when in position. This bearing $g^4$ also extends from the top to the bottom of the sections forming the chamber G and has in its face a rectangular recess $g^5$, the bottom of said recess being provided with the triangular orifice $g^6$ leading to the interior of the disk chamber. At the right of the bearing $g^4$ and extending into the chamber are the two inlet orifices N, N covered by the strainers $n'$ said strainers being held in position by means of the clamps $n^2$ together with the projections $n^3$.

Any suitable means may be provided for adjusting the orifices to correspond with the varying pressures to which the said meter may be subjected. In order, however, to show an operative construction, I have shown (see Fig. 3), that one of the bearing faces $b$ is provided with semi-circular recesses $b^2$ and that the upper face of the bearing surface $g^4$ is provided with index arrows as illustrated, while the corresponding bearing $g^3$ is provided with a small projection $g^7$, which when the chamber G is inserted into the casing B, rests in some one of the recesses $b^2$ according to the desired adjustment of the delivery orifice.

In the modification shown in Fig. 6, I employ an external shaft $p$ connected to a pinion $p'$, said pinion being partially located in a recess formed in the metal of the casing B and projecting far enough from the inner face of said case to engage with a tooth rack suitably formed on the bearing surface $g^4$ of the measuring chamber case G. This structure would not interfere with the structure shown in Fig. 3, inasmuch as the bearing surface $b$ of the main casing B and the effective bearing surface $g^4$ of the measuring chamber is not disturbed. Any suitable means may be connected to the shaft $p$ outside of the case to indicate the position of the orifices and for adjusting the same to correspond with the varying pressures to which said meter may be subjected.

Should I find it desirable to regulate the intake opening instead of the delivery opening, it will only be necessary to change the position of the measuring chamber within the main casing in which case, the delivery orifice will become the inlet orifice and the inlet orifice will become the delivery orifice.

In the position indicated in Fig 3, the index pointer 40 is located adjacent the delivery orifice. In such position, a meter of the type illustrated will deliver a certain amount of water under 40 pounds normal pressure. If for any reason, the normal pressure should be increased to 70 pounds, and it should be desired to continue to deliver the same amount of water, the chamber G would be lifted out of the casing and turned until the projection $g^7$ should register with the middle recess $b^2$ and drop back into position in which case, the broad bearing surface $g^4$ would partially cover the discharge opening through the orifice E to such an extent as to reduce the quantity of water delivered. In like manner, if the pressure should be increased to 100 pounds and it should be required to have a delivery the same as in the first two cases, the chamber $g$ will be adjusted so as to bring the indicator "100" adjacent to the delivery orifice with the projection $g^7$ in the third recess $b^2$. In this position, it will be seen that the bearing surface $g^4$ more nearly closes the discharge orifice E of the delivery orifice, thus reducing the outflow.

Water, in its passage through the meter, comes in at the intake orifice D and completely fills the interior portion of the casing or water chamber B, and thence through the strainers $n$ into the interior of the chamber G, where its passage causes the disk H to operate with its wabbling motion and the water finds exit through the discharge $g^6$ and the delivery orifice E.

As a convenient means for connecting the upper member A and the lower member B of the meter casing, I make use of the nut ring O consisting of the series of nuts $o$ connected together by means of the base plate or ring $o'$. The base ring $o'$ is made to conform to the flange B' and may be secured thereto in any convenient manner, as by means of the small screws $o^2$. With the threaded nuts $o$ registering with the apertures through the flange B', the bolts C being inserted through the apertures of the upper flange A', may be screwed home into the threaded nuts $o$ of the nut ring O and in this manner, the sections A and B may be readily connected together. The convenience of such a device, will be apparent when it is stated that ordinarily a meter is located in a pit or trench considerably below the ground level, where access to the same is only had with difficulty. When it is desired to inspect the meter for purpose of repair or otherwise, it becomes necessary to remove the upper section A and in replacing the same, if independent nuts were used, considerable difficulty would be met with in locating the said nuts in registry with the apertures through the flanges and in the narrow space, the independent nuts are liable to slip from the hands of the operator and become lost in the pit, whereas by the structure above disclosed, the nuts are always held in position and in registry with the apertures through the flanges, ready to insert the bolts C. Another point in this connection should be mentioned, and that is, that the base ring o' being integrally connected to the nuts o serves to prevent the turning of the nuts o when screwing the bolts C home. Should, however, in the continued use of the nut ring the threads in any particular nut become stripped, the thinness of the connecting base ring o' readily permits the nut to be broken away from the same and a new or independent nut to be substituted for the one so destroyed.

In meters of this type, the measuring chamber G is usually made of brass and where the bearings K and L are integral with the upper and lower heads of this chamber G, it is found that the spherical bearing I has such abrasive effect upon such bearings that they last but a short time. I have found that by constructing the bearings K and L of hard phosphor bronze, making them independent of the upper and lower heads of the chamber G as shown, avoids this difficulty and gives increased length of life to the meter. These bearings K and L are forced into place either by hydraulic pressure or by shrinking into position and are then turned or milled to fit the spherical bearing I. The small screws L' may be utilized for holding the under bearing in position against accidental displacement if desired.

The disk H and the bearing I must in all cases, be made of hard rubber, and the bearings K and L of phosphor bronze, in order that there shall be as little wear as possible to the parts.

Another feature of my invention resides in an improved thrust roller for the disk H. In practice, unless some special arrangement is made, the twist or strain upon the shank of the roller is sufficient to break the same off and thereby render the roller useless. By a special construction of the roller and its shank, I am enabled to so strengthen the same as to effectually resist, not only the creeping tendency of the disk, but also, the liability of the shank of the roller to fracture. The roller $h^3$ travels vertically in the curved slot $h^5$ and is held in position upon the periphery of the disk H by means of the long shank $h^4$ which is received into an aperture in the edge of the disk as shown. The roller proper $h^3$ is made of hard rubber and is rigidly mounted upon the shank $h^4$, the shank rotating with the roller.

The diaphragm M is secured in position in such a way as to preserve the integrity of the upper and lower walls of the disk chamber by curving the slots or grooves $m$ near their ends, so that they run substantially parallel with the outer faces of the upper and lower walls without cutting through them, said slots extending through the outer face of the bearing surface $g^4$, as illustrated in Fig. 5, leaving solid metal at the upper and lower points of said bearing surface, and thereby adding material strength at these points. The configuration of the slots is clearly shown in dotted lines in Fig. 2, where it will be noted that if said slots were continued in substantial radial lines, they would cut through both top and bottom. The curved extensions, however, as shown in said Fig. 2, leave the top and bottom faces of the chamber sections unmutilated and of their original strength.

I claim:

1. In a water meter, the combination of a main casing having inlet and discharge orifices, an angularly adjustable measuring chamber within said main casing having inlet and discharge orifices, said orifices being in circumferentially adjustable registry with each other.

2. In a water meter, the combination of a main casing, a measuring chamber within said main casing, said chamber and casing having communicating inlet and discharge orifices and means for adjusting said chamber within said casing, to vary the communication between one pair of said orifices to correspond with the varying pressures to which the meter may be subjected.

3. In a water meter, the combination of a main casing, a measuring chamber within said main casing, said chamber and casing having communicating orifices and means for adjusting said chamber within said casing, to vary the communication between said orifices to correspond with the varying pressures to which said meter may be subjected.

4. In a water meter, the combination of a main casing, a measuring chamber within said main casing, said chamber and casing having communicating inlet and discharge orifices and means for setting said chamber with respect to said casing whereby the size of one of said orifices may be adjusted to correspond to the varying pressures to which the meter may be subjected.

5. In a water meter, the combination of a main casing, a measuring chamber within said main casing, said chamber and casing having communicating inlet and discharge orifices and adjustable means for setting said chamber within the main casing whereby one of said orifices may be adjusted in cross-section to correspond to the varying pressures to which the meter may be subjected.

6. In a water meter, the combination of a meter casing and a rotatably adjustable measuring chamber within said casing.

7. In a water meter, the combination of a meter casing, a measuring chamber within said casing and means for rotatably adjusting said chamber within said casing.

8. In a water meter, the combination of a meter casing and a measuring chamber rotatably adjustable within said casing, said chamber and casing having communicating ports in adjustable registry according to the rotatably adjusted position of said chamber.

9. In a water meter, the combination of a meter casing and a measuring chamber within said casing, said parts having registering inlet and discharge orifices, means for rotating said measuring chamber to vary the registry of said inlet and discharge orifices.

10. In a water meter, the combination of a main casing having a discharge orifice, an angularly adjustable measuring chamber within said main casing having a delivery port in circumferentially adjustable communication with said discharge orifice.

11. In a water meter, the combination of a main casing having a discharge orifice, an angularly adjustable measuring chamber within said main casing, said chamber having a delivery port normally in open communication with said discharge orifice, means for adjusting said measuring chamber within said main casing to vary the size of the opening between said delivery port and said discharge orifice.

12. In a water meter, the combination of a main casing, a rotatably adjustable measuring chamber within said main casing, a series of interior bearing faces within said main casing, a series of bearing faces located upon the exterior of said measuring chamber, said chamber having a delivery port leading from the interior of said measuring chamber through one of its bearing faces, said casing having a discharge passage leading from within through one of its bearing faces, said delivery port and discharge passage being normally in registry and means for rotatably adjusting said measuring chamber to vary the registry of said port and passage.

13. In a water meter, the combination of a main casing having inlet and discharge orifices, a measuring chamber within said main casing, and having an inlet in communication with said main casing and a delivery port in substantial registry with said discharge orifice and means for rotatably adjusting said measuring chamber within said main casing to vary the discharge opening between said delivery port and said discharge orifice.

14. In a water meter, the combination of a main casing having inlet and discharge orifices, an angularly adjustable measuring chamber within said main casing having inlet and delivery ports, said delivery ports being in circumferentially adjustable registry with said discharge orifice.

15. In a water meter, the combination of a main casing having inlet and discharge orifices, an angularly adjustable measuring chamber within said main casing, bearing faces in said main casing, corresponding bearing faces upon the outer side of said measuring chamber, said chamber having inlet and delivery ports, said delivery port being in circumferentially adjustable registry with said discharge orifice.

16. In a water meter, the combination of a main casing having a broad bearing face upon its interior and a discharge orifice leading from said bearing face, a measuring chamber within said main casing, a broad bearing face upon the exterior of said measuring chamber, said chamber having a delivery port leading from the interior through said latter bearing face, means for adjusting said chamber to vary the opening between said delivery port and discharge orifice.

17. In a water meter, the combination of a main casing have a discharge orifice, a rotatably adjustable measuring chamber within said main casing, said chamber having a delivery port leading from within to said discharge orifice, means for setting said measuring chamber in various adjusted fixed positions within said main casing to vary the opening between said delivery port and said discharge orifice.

This specification signed and witnessed this 7th day of Sept. 1906.

ERNEST E. GAMON.

Witnesses:
C. E. WENZEL,
FREDK. C. FISCHER.